United States Patent

Fuller et al.

[11] 3,930,518
[45] Jan. 6, 1976

[54] VALVES

[75] Inventors: John Alfred Fuller; Edwin Smith, both of Huddersfield, England

[73] Assignee: Hopkinsons, Ltd., Huddersfield, England

[22] Filed: May 8, 1974

[21] Appl. No.: 468,057

[30] Foreign Application Priority Data
Apr. 4, 1974 United Kingdom............... 14954/74

[52] U.S. Cl. ................................................. 137/487
[51] Int. Cl.² ....................................... F16K 31/36
[58] Field of Search.................. 137/486, 487, 487.5

[56] References Cited
UNITED STATES PATENTS

| | | | |
|---|---|---|---|
| 2,600,073 | 6/1952 | Plank | 137/487 |
| 2,623,539 | 12/1952 | Lee | 137/487 |
| 2,938,536 | 5/1960 | Ehrenberg | 137/486 |
| 3,765,444 | 10/1973 | Kosugi | 137/486 |

Primary Examiner—Henry T. Klinkstiek
Attorney, Agent, or Firm—Sughrue, Rothwell, Mion, Zinn & Macpeak

[57] ABSTRACT

In a fluid system a valve is provided with a valve closing system and this system is operated by differential switch means which detect abnormal flow conditions through the valve. The valve is tapped preferably at two locations and each location is connected to a differential pressure switch which in turn operate the valve closing system.

7 Claims, 6 Drawing Figures

VALVES

This invention relates to valves for controlling the flow of compressible and non-compressible fluids.

In particular, the present invention relates to such valves which are required to close when there is a significant increase in flow rate and wherein the closing force for the valves is provided either by a stored energy system external to the valve, or by the fluid passing through the valve. An example of such a valve is the main steam isolating valve of a light water nuclear reactor system operating under boiling water, or pressurised water or other principle.

It will be manifest that such a main steam isolating valve must close instantaneously in the event of a catastrophic failure of the piping system either upstream or downstream of the valve, and conventionally the signal to initiate such valve closure is provided by a device of any convenient form disposed in the piping system.

It is an object of the present invention to provide such a fluid-controlling valve which self-initiates its closure under abnormal flow conditions.

According to the present invention there is provided a valve for controlling the flow of compressible and non-compressible fluids and comprising, between the valve inlet and outlet, differential pressure switch means adapted to detect abnormal flow conditions through the valve and to actuate a valve-closing system.

The valve may have a Venturi-shaped passage between its inlet and outlet and the differential pressure switch means may be disposed between valve inlet and throat tappings and/or throat and valve outlet tappings.

The differential pressure switch means is, as aforesaid, capable of distinguishing between normal flow conditions through the valve, i.e. normal pressure drop across the valve, and abnormal flow conditions such, for example, as would be indicated by the pressure drop occuring when the fluid flowing through the control orifice attains critical velocity, i.e. the speed of sound for the fluid conditions pertaining in the valve.

An embodiment of the present invention will now be described, by way of example, with reference to the accompanying drawings, in which.

Figure 1:
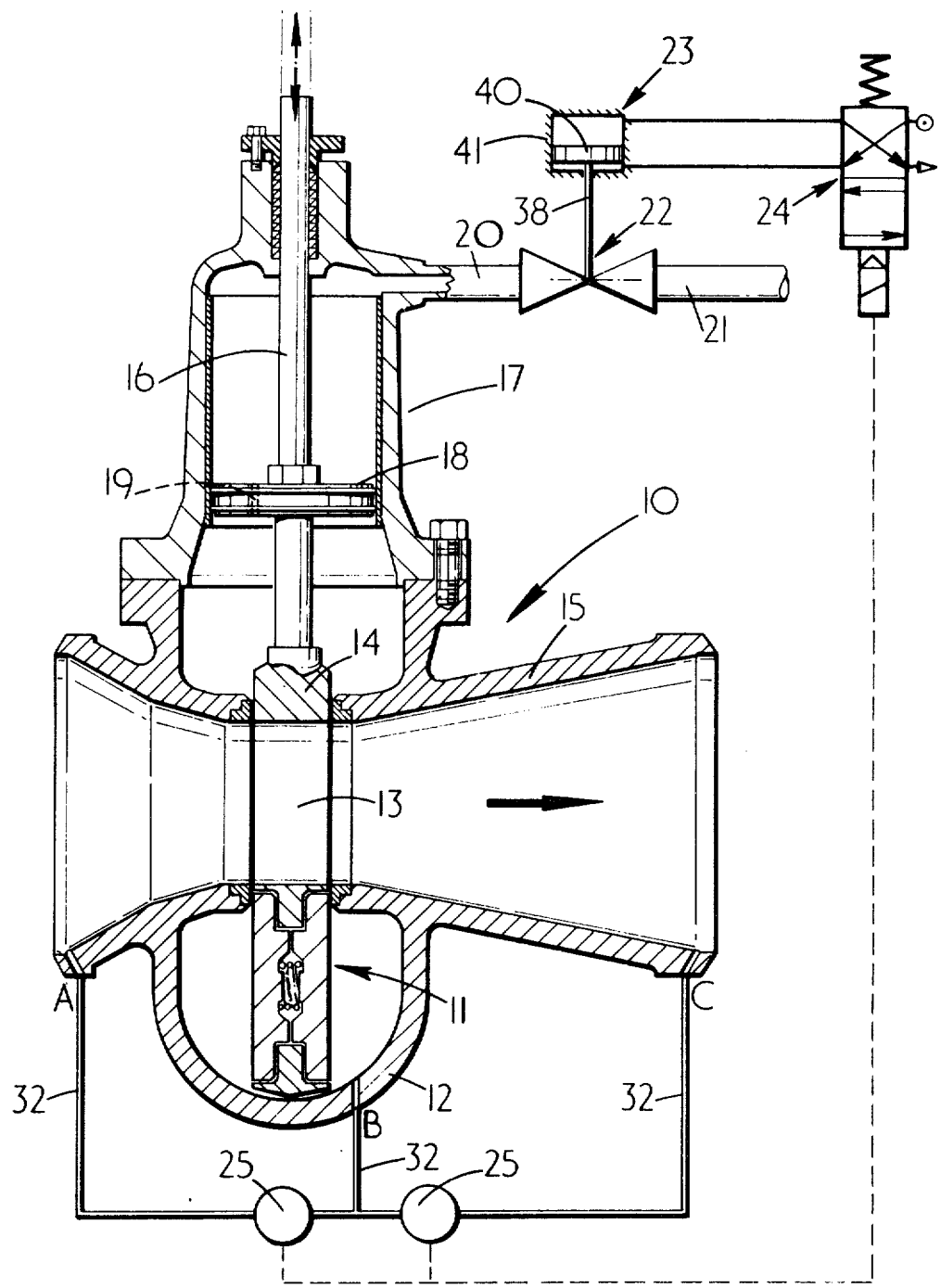
FIG. 1 is a diagrammatic view of a parallel slide venturi-gate valve incorporating the self-initiating closure characteristic of the present invention.

Referring firstly to FIG. 1, there is shown a parallel slide venturi-gate valve 10 capable of being employed as the main steam isolating valve in a light water nuclear reactor system.

The valve 10 is a well known design and is shown in open condition, the valve closure disc assembly 11 being in its lower position in the valve lid 12 with the aperture 13 of the belt eye 14 in register with the control orifice of the valve body 15. The passage through the valve is Venturi shaped as can clearly be seen.

The valve 10 is loaded by any convenient means (not shown) as is well known to those skilled in the art and its spindle 16 is coupled to a high speed hydraulic actuator (not shown) for normal opening and closing.

A steam cylinder 17 is provided for emergency closure. The steam cylinder 17 is mounted on the valve body 15 and within the cylinder 17 is a piston 18 fast on the valve spindle 16. The piston 18 is formed with a control orifice generally and diagrammatically indicated at 19 so that under normal conditions there is equal steam pressure at each side of the piston 18.

A vent 20 is provided at the top of the cylinder 17 and exhaust piping 21 extends from the vent 20 and incorporates a valve 22 which will be described in greater detail with reference to FIG. 3.

Briefly, however, the valve 22 has a pneumatic actuator 23 connected to a pneumatic supply via a continuously energised solenoid operated valve 24 which constitutes part of an electric control system.

The valve 10 is shown diagrammatically as being tapped at locations A, B and C. A differential pressure switch 25 incorporating a limit switch is connected between tappings A and B and tappings B and C, which switches are electrically connected to the valve 24.

With the valve 10 open as shown and normal flow conditions prevailing steam flows through the valve body 15 (it is to be noted that the steam flow can be in either direction). The valve 22 is closed by its pneumatic actuator 23.

Steam leaks past the belt 14 into the cylinder 17 underneath the piston 18 and via control orifice 19 to provide equal steam pressure conditions above and below the piston 18 as aforesaid.

If now abnormal flow conditions prevail for whatever reason, such conditions are detected by one or both differential pressure switches 25 which operate their limit switches which transmit a signal to reverse the valve 24 and consequently pneumatic flow therethrough so that the pneumatic actuator 23 opens valve 22 to allow venting of the upper side of the piston 18 through 20, and piping 21 and valve 22. The resultant unbalanced force on the piston 18 closes the valve 10.

The differential pressure switch may be of any convenient construction and a suitable proprietory unit which can be suitably employed is the "Barton differential pressure unit" produced and sold by GEC-Elliot Process Instruments Limited. Such unit which is well known to those skilled in the art comprises essentially a rupture proof bellows unit assembly enclosed in a pair of connected pressure housings.

The bellows unit comprises a pair of flexible metal bellows defining high and low pressure sides and mounted on opposite sides of a centre plate with the outer ends of the bellows sealed and rigidly interconnected internally by a stem passing through an annular hole in the centre plate. Opposed valves mounted on the stem seal against complementary valve seats on the centre plate at predetermined positions of the stem. The bellows interior and centre plate hole are completely filled with a noncorrosive low freezing point liquid, for example an ethylene glycol-water mixture. A temperature compensator in the form of an extra bellows attached to the high pressure side is provided in the bellows unit, which extra bellows acts as a surge unit, and range springs surrounding the stem are enclosed in the bellows.

A torque tube assembly is connected to the bellows unit so as to transmit the linear motion of the latter to a rotary motion.

The range springs act with both bellows and the torque unit assembly to balance differential pressures applied to the bellows unit.

In operation, the bellows move in proportion to the pressure applied across the bellows unit assembly and the bellows linear motion is mechanically transmitted as a rotary motion through the torque tube assembly.

It is the torque tube assembly which operates the limit switches of the switches 25.

Figure 2A:
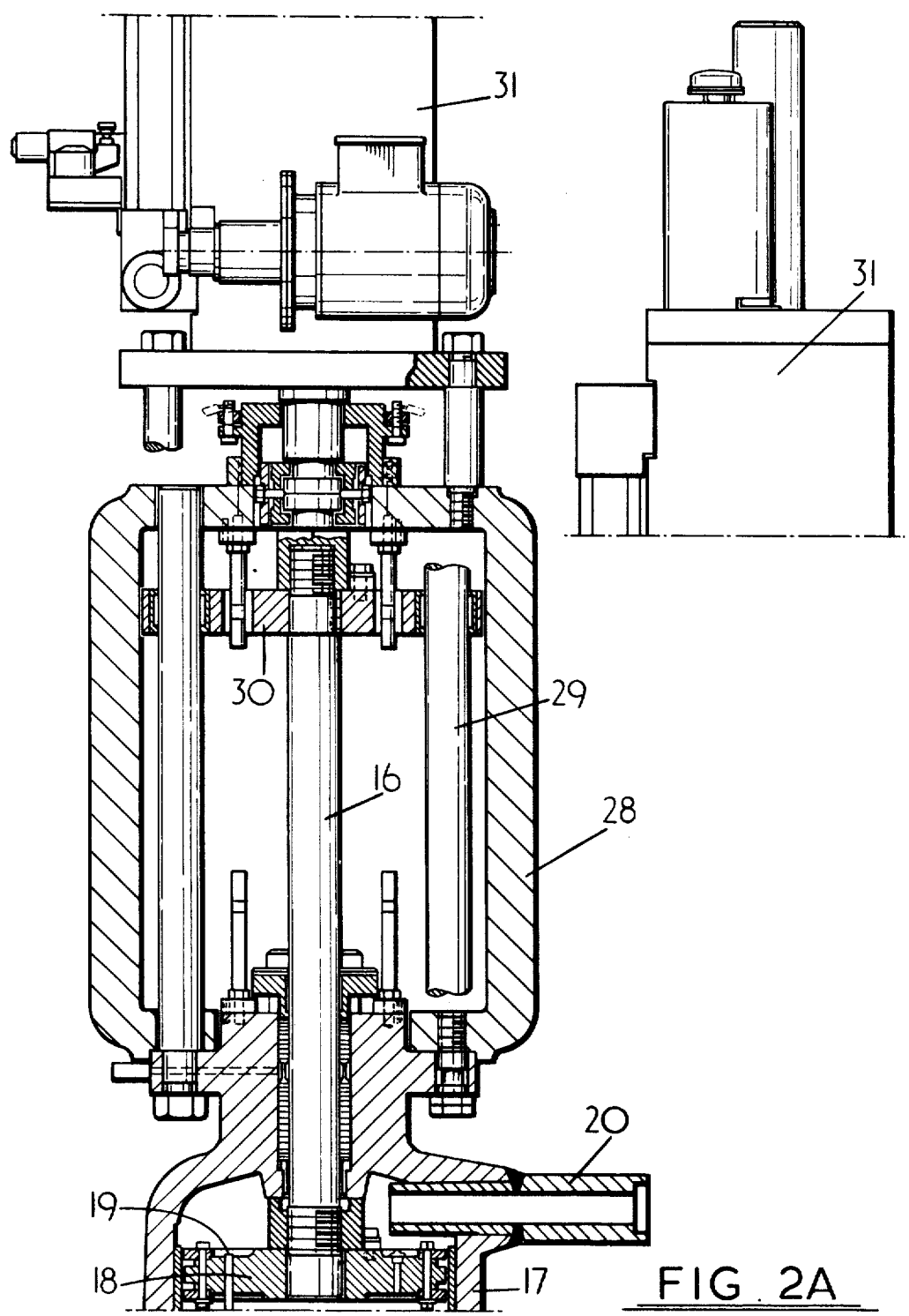
FIGS. 2A and 2B show jointly a sectional view of the parallel slide venturi-gate valve.
Figure 2B:
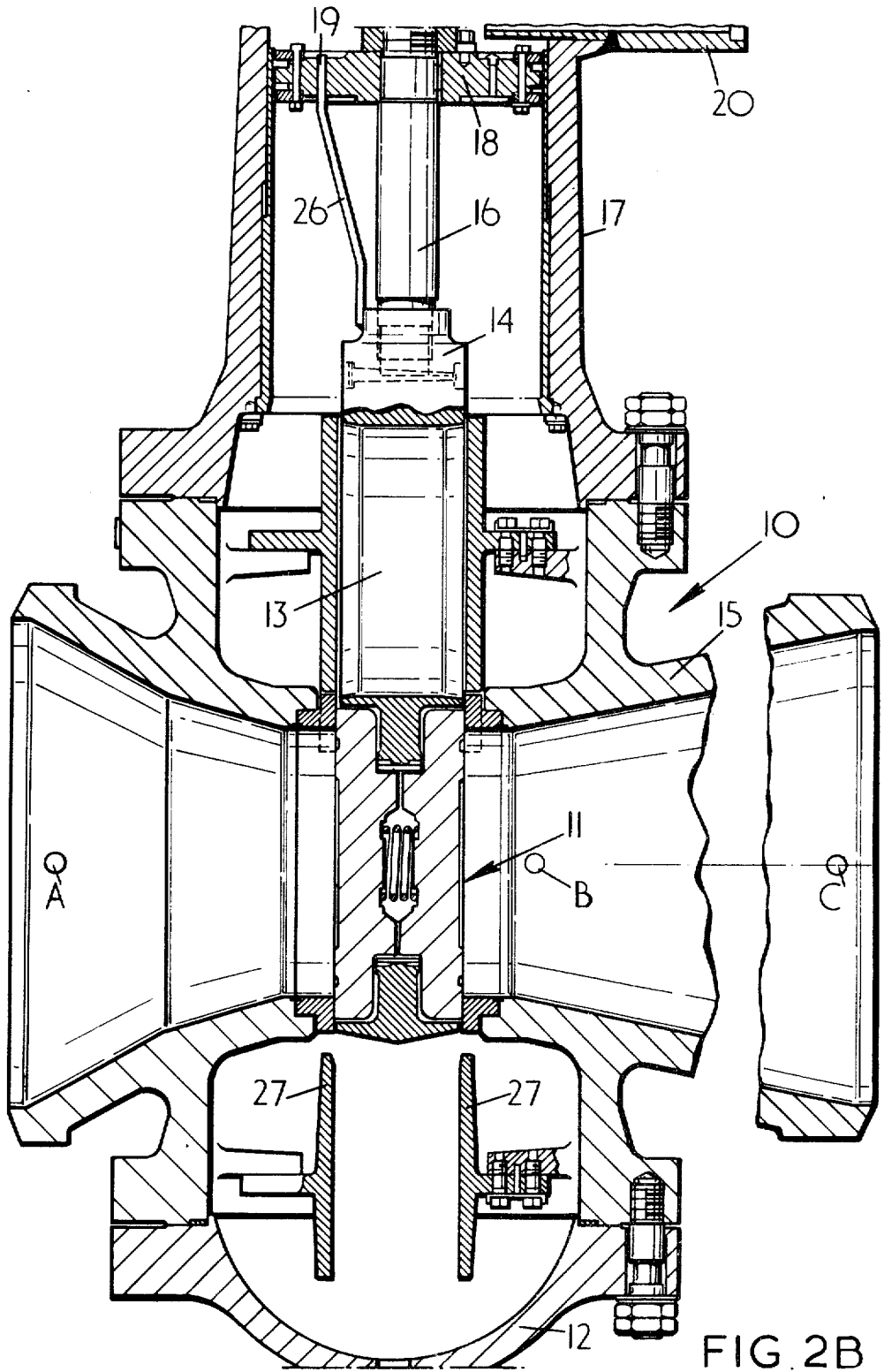

Reference is now made to FIGS. 2A and 2B which show the parallel slide venturi gate valve 10 in greater detail and like parts to those referred to in FIG. 1 are referred to by the same reference numerals.

In FIGS. 2A and 2B the valve 10 is shown closed.

It is firstly to be noted that it is preferred that tapping B be in the region of the throat of the Venturi.

The control orifice 19 is provided by a drain tube 26 traversing the piston 18.

In the lid 12, the customary disc guides 27 are provided.

Above the cylinder 17 is a yoke 28 mounting pillars 29 along which slide a stop plate 30 fast with the spindle 16.

Mounted above the yoke 28 is the hydraulic cylinder 31 which is used for normal opening and closing of the valve.

This form of parallel slide venturi gate valve is so well known to those skilled in the art that no further description will be given other than to say that tappings A, B and C are connected to the pressure housings of the differential pressure switches 25 by piping 32 (see FIG. 1).

Figure 3:
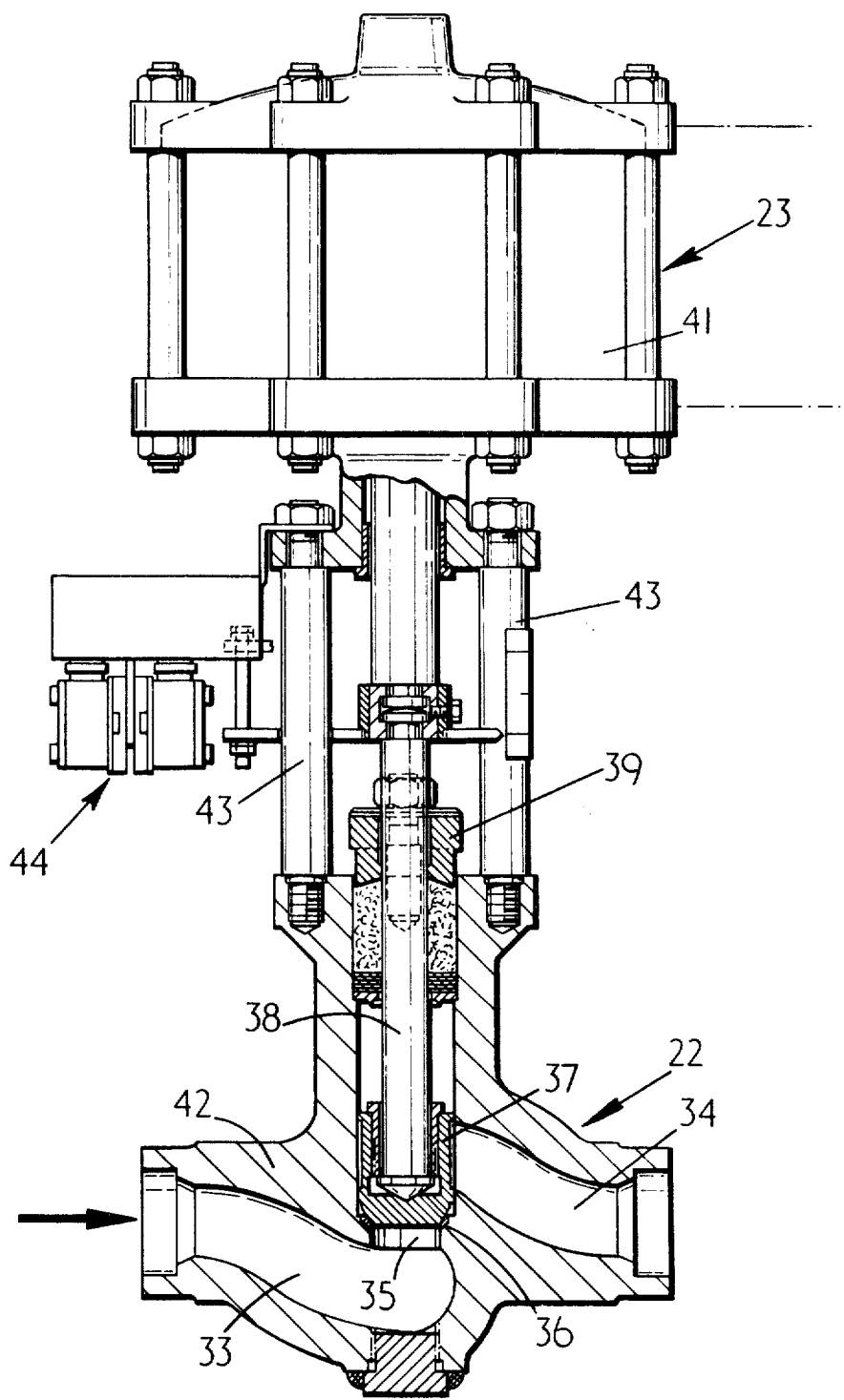
FIG. 3 is a sectional view of a stop valve employed in the valve-closing system of the slide valve; and, FIGS. 4 and 5 are alternative switching systems for use in the valve-closing system of the slide valve.

Reference is now made to FIG. 3 which shows valve 22 and pneumatic actuator 23 in greater detail.

The valve 22 has essentially parallel inlet and outlet passages 33 and 34 which are in intercommunication via a vertical passage 35 providing a valve seat 36 for a valve head 37. The latter is connected by a spindle 38 which traverses a gland 39 and is connected to a piston 40 in the pneumatic cylinder 41.

The cylinder 41 is supported above the body 42 of the valve 22 by pillars 43.

An "open" and "closed" light indicating switch assembly 44 is mounted on one of the pillars 43.

Here again this form of valve is well known to those skilled in the art and will not be described further.

Figure 4:
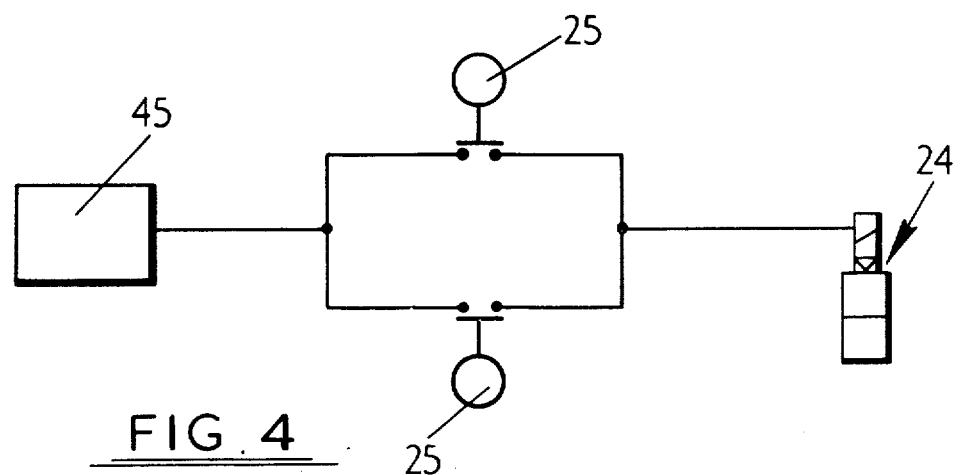
Figure 5:
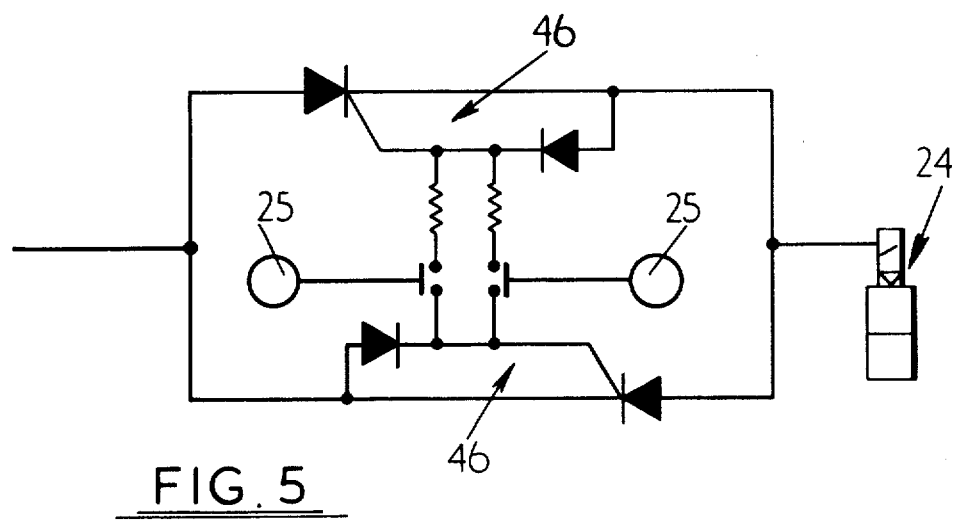

Turning now to FIGS. 4 and 5, there is shown two simple circuits which can be employed between the differential pressure switches 25 and the solenoid-operated valve 24.

FIG. 4 shows a system usable with light currents, the A.C. or D.C. supply being indicated at 45.

In FIG. 5, the system is usable with heavier currents and in this case electronic relays 46 are employed.

What we claim is:

1. A control valve for regulating the flow of compressible and non-compressible fluids in a fluid system and comprising: a control valve body having in spatial relationship a fluid inlet and a fluid outlet; a movable control valve gate member between the inlet and outlet for controlling fluid flow through the control valve body; differential pressure switch means connected to spaced tappings in the control valve body for detecting abnormal fluid flow conditions therein; and means initiated by the differential pressure switch means for closing the movable gate member when abnormal fluid flow conditions prevail in said fluid system, the means including a piston-and-cylinder assembly provided with a vent to atmosphere and operatively connected to the valve gate member and adapted to be maintained in a balanced, position when the valve gate member is open by the fluid of the system under normal fluid flow conditions, a normally-closed venting valve operatively connected to said piston-and-cylinder assembly for controlling venting of said cylinder, a pneumatic supply source, a pneumatic actuator connected to said pneumatic supply source and said venting valve for operating the latter, and an electrically-operated valve disposed between the pneumatic actuator and the pneumatic supply source and operatively connected to the differential pressure switch means to effect venting of the piston-and-cylinder assembly when abnormal fluid conditions prevail via the pneumatic actuator and venting valve to create fluid imbalance in the assembly and resulting control valve closure.

2. A control valve as claimed in claim 1, in which the control valve is a parallel slide venturi gate valve; the control valve body is tapped adjacent its inlet and outlet and at the venturi throat, the tappings being connected by piping to two differential pressure switches, one between inlet and throat tappings and the other between throat and outlet tappings.

3. A control valve as claimed in claim 1 in which the electrically-operated valve is a continuously-energised solenoid operated valve.

4. A control valve as claimed in claim 3, in which the solenoid-operated valve is connected to an electrical supply via adjustable snap-acting switches controlled by the differential pressure switches.

5. A control valve as claimed in claim 4, in which each differential pressure switch comprises a fluid pressure operated bellows unit assembly adapted to actuate a torque tube assembly which, in turn, operates the snap-acting switches.

6. A control valve as claimed in claim 3, in which the solenoid-operated valve is connected to an electrical supply via electronic relay means controlled by the differential pressure switches.

7. A control valve as claimed in claim 6, in which each differential pressure switch comprises a fluid pressure operated bellows unit assembly adapted to actuate a torque tube assembly which, in turn, operates the electronic relay means.

* * * * *